United States Patent
Herman et al.

(10) Patent No.: US 8,909,961 B2
(45) Date of Patent: Dec. 9, 2014

(54) METHOD AND APPARATUS FOR ADJUSTING POWER CONSUMPTION LEVEL OF AN INTEGRATED CIRCUIT

(75) Inventors: Jeffrey Herman, Sunnyvale, CA (US); Krishna Sitaraman, San Jose, CA (US); Jia An Huang, Toronto (CA); Stephen D. Presant, San Jose, CA (US); Ali Ibrahim, Oakland, CA (US); Ashwini Dwarakanath, San Jose, CA (US)

(73) Assignees: ATI Technologies ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 268 days.

(21) Appl. No.: 13/305,868

(22) Filed: Nov. 29, 2011

(65) Prior Publication Data
US 2013/0138977 A1     May 30, 2013

(51) Int. Cl.
G06F 1/00     (2006.01)
G06F 1/32     (2006.01)

(52) U.S. Cl.
USPC .................... 713/322; 713/300; 713/320

(58) Field of Classification Search
USPC ................................................ 713/300
See application file for complete search history.

(56) References Cited

U.S. PATENT DOCUMENTS

| | | |
|---|---|---|
| 3,919,695 A | 11/1975 | Gooding |
| 4,503,490 A | 3/1985 | Thompson |
| 4,545,030 A | 10/1985 | Kitchin |
| 5,021,950 A | 6/1991 | Nishikawa |
| 5,307,003 A | 4/1994 | Fairbanks et al. |
| 5,420,808 A | 5/1995 | Alexander et al. |
| 5,452,434 A | 9/1995 | MacDonald |
| 5,490,059 A | 2/1996 | Mahalingaiah et al. |
| 5,502,838 A | 3/1996 | Kikinis |
| 5,561,792 A | 10/1996 | Ganapathy |
| 5,634,131 A | 5/1997 | Matter et al. |
| 5,696,953 A | 12/1997 | Wong et al. |
| 5,812,860 A * | 9/1998 | Horden et al. ............... 713/322 |
| 5,910,930 A | 6/1999 | Dieffenderfer et al. |
| 6,119,241 A | 9/2000 | Michail et al. |
| 6,141,762 A | 10/2000 | Nicol et al. |

(Continued)

OTHER PUBLICATIONS

Kevin J. Nowka, Gary D. Carpenter, Eric W. MacDonald, Hung C. Ngo, Bishop C. Brock, Koji I. Ishii, Tuyet Y. Nguyen, and Jeffrey L Burns, A 32-bit PowerPC System-on-a-Chip With Support for Dynamic Voltage Scaling and Dynamic Frequency Scaling, IEEE Journal of Solid-State Circuits, vol. 37, No. 11, Nov. 2002.

(Continued)

*Primary Examiner* — Suresh Suryawanshi
(74) *Attorney, Agent, or Firm* — Faegre Baker Daniels LLP

(57) ABSTRACT

Briefly, a method and apparatus adjusts the power consumption level of an integrated circuit by dynamically scaling the clock frequency based on the real-time determined power consumption level. In one example, the method and apparatus changes an actual clock frequency of the integrated circuit to an effective clock frequency based on the maximum clock frequency and the difference between the threshold power consumption level and the actual power consumption level of the integrated circuit in the previous sampling interval. In one example, an effective clock frequency of the integrated circuit in the current sampling interval is determined. In one example, the difference between the maximum and effective clock frequencies in the current sampling interval is proportional to the difference between the threshold and actual power consumption levels in the previous sampling interval. The actual clock frequency of the integrated circuit is changed to the determined effective clock frequency.

23 Claims, 6 Drawing Sheets

(56) References Cited

U.S. PATENT DOCUMENTS

| | | | |
|---|---|---|---|
| 6,671,815 B2 | 12/2003 | Iwamura et al. | |
| 6,795,927 B1* | 9/2004 | Altmejd et al. | 713/300 |
| 6,889,332 B2 | 5/2005 | Helms et al. | |
| 6,971,037 B2 | 11/2005 | Oshima et al. | |
| 6,978,389 B2 | 12/2005 | Jahnke | |
| 7,062,666 B2 | 6/2006 | Maher et al. | |
| 7,100,061 B2 | 8/2006 | Halepete et al. | |
| 7,155,617 B2* | 12/2006 | Gary et al. | 713/300 |
| 7,453,756 B2 | 11/2008 | Moyer et al. | |
| 7,464,276 B2 | 12/2008 | Rusu et al. | |
| 7,506,185 B2 | 3/2009 | Lin | |
| 7,536,575 B2 | 5/2009 | Adachi | |
| 7,904,287 B2* | 3/2011 | Lefurgy et al. | 703/21 |
| 8,010,824 B2 | 8/2011 | Naffziger | |
| 8,060,765 B1 | 11/2011 | Cha et al. | |
| 8,086,887 B2* | 12/2011 | Akimoto | 713/340 |
| 8,527,794 B2 | 9/2013 | Ibrahim et al. | |
| 2008/0022140 A1 | 1/2008 | Yamada et al. | |

OTHER PUBLICATIONS

Advance Information, PowerPC 603e™ RISC Microprocessor, Technical Summary, Motorola Inc. 1995.

Michael Slater, Motorola and IBM Unveil PowerPC 603, Slightly Slower than 601 at One-Third the Power Consumption, Microprocessor Report, vol. 7, No. 14, Oct. 25, 1993, MicroDesign Resources.

Thomas Burd, Trevor Pering, Anthony Stratakos, Robert Brodersen, WA 17.4 a Dynamic Voltage Scaled Microprocessor System, 2000 IEEE International Solid-State Circuits Conference.

Andrea Acquaviva, Luca Benini, Bruno Ricco, An Adaptive Algorithm for Low-Power Streaming Multimedia Processing.

S.B. Furber, J.D., D.A. Gilbert, AMULET3: A High-Performance Self-Timed ARM Microprocessor.

J.D. Garside, S. B. Furber and S-H Chung, AMULET3 Revealed, Department of Computer Science, The University of Manchester, Oxford Road, Manchester.

Diana Marculescu, Anoop Iyer, Application-Driven Processor Design Exploration for Power-Performance Trade-off Analysis, Dept. of Electrical and Computer Engineering, Carnegie Mellon University, 2001 IEEE.

Greg Semeraro, David H. Albonesi, Steven G. Dropsho, Grigorios Magklis, Sandhya Dwarkadas and Michael L. Scott, Dynamic Frequency and Voltage Control for a Multiple Clock Domain Microarchitecture, Department of Electrical and Computer Engineering and Department of Computer Science, University of Rochester, Rochester, NY, 2002 IEEE.

Thomas D. Burd, Trevor A. Pering, Anthony J. Stratakos, and Robert W. Brodersen, A Dynamic Voltage Scaled Microprocessor System, IEEE Journal of Solid-State Circuits, vol. 35, No. 11, Nov. 2000.

Johan Pouwelse, Koen Langendoen, Henk Sips, Dynamic Voltage Scaling on a Low-Power Microprocessor, Faculty of Information Technology and Systems, Delft University of Technology, The Netherlands.

Vikas Chandra, Gary Carpenter, Jeff Burns, Dynamically Optimized Synchronous Communication for Low Power System on Chip Designs, 2003 IEEE.

Kihwan Choi, Karthik Dantu, Wei-Chung Cheng, and Massoud Pedram, Frame-Based Dynamic Voltage and Frequency Scaling for a MPEG Decoder, Department of EE-Systems, University of Southern California, Los Angeles, CA, 2002 IEEE.

Sascha Uhrig, Theo Ungerer , Hardware-based Power Management for Real-Time Applications, institute of Computer Science, University of Augsburg, 2003 IEEE.

David E. Lackey, Paul S. Zuchowski, Thomas R. Bednar, Douglas W. Stout, Scott W. Gould, John M. Cohn, Managing Power and Performance for System-on-Chip Designs using Voltage Islands, IBM Microelectronics Division, Essex Junction, Vermont, 2002 IEEE.

Anoop Iyer, Diana Marculescu, Microarchitecture-Level Power Management, IEEE Transactions on Very Large Scale Integration (VLSI) Systems, vol. 10, No. 3, Jun. 2002.

Anoop Iyer, Diana Marculescu, Power and Performance Evaluation of Globally Asynchronous Locally Synchronous Processors, Electrical and Computer Engineering Department, Carnegie Mellon University, Pittsburgh, PA, 2002 IEEE.

Anoop Iyer, Diana Marculescu, Power Aware Microarchitecture Resource Scaling, Department of Electrical and Computer Engineering Center for Electronic Design Automation, Carnegie Mellon University, Pittsburgh PA, 2001 IEEE.

Anoop Iyer, Diana Marculescu, Power Efficiency of Voltage Scaling in Multiple Clock, Multiple Voltage Cores, Department of Electrical and Computer Engineering, Carnegie Mellon University, Pittsburgh PA, 2002 IEEE.

Tom Quinlan, PowerPC 603 Tailored to Portables; Conserves Power, Infoworld, Oct. 18, 1993, p. 6.

Ruchir Puri, Leon Stok, John Cohn, David Kung, David Pan, Dennis Sylvester, Ashish Srivastava, Sarvesh Kulkarni, Pushing ASIC Performance in a Power Envelope, DAC 2003, Jun. 24, 2003, Anaheim, California.

Trevor Pering, Thomas Burd, and Robert Brodersen, Voltage Scheduling in the IpARM Microprocessor System, Berkeley Wireless Research Center, University of California, Berkeley, CA, ZSLPED '00, Rapallo, Italym Copyright 2000.

Koushik Niyogi, Diana Marculescu, Speed and Voltage Selection for GALS Systems Based on Voltage/Frequency Islands, Carnegie Mellon University, 2005 IEEE.

Trevor Pering, Tom Burd, and Robert Brodersen, The Simulation and Evaluation of Dynamic Voltage Scaling Algorithms, University of California Berkeley Electronics Research Laboratory, Berkeley, CA, 1998 ACM.

Emil Talpes and Diana Marculescu, Toward a Multiple Clock/Voltage Island Design Style for Power-Aware Processors, IEEE Transactions on Very Large Scale Integration (VLSI) Systems, vol. 13, No. 5, May 2005.

Seongsoo Lee and Takayasu Sakurai, Run-Time Power Control Scheme Using Software Feedback Loop for Low-Power Real-Time Applications, Center for Collaborative Research and Institute of Industrial Science, University of Tokyo, 2000 IEEE.

Bellosa, Frank, "The Benefits of Event-Driven Energy Accounting in Power-Sensitive Systems", Proceedings of the 9th workshop on ACM SIGOPS European workshop: beyond the PC: new challenges for the operating system, 2000, pp. 37-42, ACM New York, NY, USA.

Haid, J. et al., "Run-time energy estimation in system-on-a-chip designs", Proceedings of the 2003 Asia and South Pacific Design Automation Conference, 2003, pp. 595-599, ACM New York, NY, USA.

Isci, Canturk et al., "Runtime Power Monitoring in High-End Processors: Methodology and Empirical Data", Princeton University Dept. of Electrical Engineering and Tech. Report EE-2003-09, Sep. 2003.

Lee, Sheayun et al., "An Accurate Instruction-Level Energy Consumption Model for Embedded RISC Processors", Proceedings of the 2001 ACM SIGPLAN workshop on Optimization of middleware and distributed systems, 2001, pp. 1-10, ACM New York, NY, USA.

* cited by examiner

METHOD AND APPARATUS FOR ADJUSTING POWER CONSUMPTION LEVEL OF AN INTEGRATED CIRCUIT

BACKGROUND OF THE DISCLOSURE

The disclosure relates generally to a method and apparatus for adjusting power consumption level of an integrated circuit.

The thermal design power (TDP) is the maximum power that can be dissipated by a computer system such as a graphic processing unit (GPU). The sum of power consumed by each individual component on a system cannot exceed this limit or risk failure or damage to the system. In order to protect the system from such a TDP violation, a power budget must be allocated to each component. This power budget can be statically defined or dynamically allocated based on which component the operating system or the user would like to give priority to. On the other hand, because the power consumption level reflects the performance of individual component (e.g., integrated circuit), too many unused power credits (i.e., TDP slack) also cause unnecessary performance loss. Accordingly, it is desired to control the power consumed by a particular component, for example, an individual integrated circuit, so that the power consumption level does not exceed the TDP budget for that component while performance loss is minimized.

Some known solutions monitor environment conditions such as temperature and/or current, and have a rigid and static response when the environmental conditions exceed a predefined threshold. When this threshold is surpassed, a signal is asserted indicating to the system that it must take protective action. The action taken by the system is to step down to the next discrete power setting until the condition is no longer present. However, this known approach is insufficient because such a coarse-grained approach can cause an overreaction. The relationship between the TDP budget and the current power consumption level is not real-time determined and not dynamically factored into the magnitude of the response, thereby causing sizeable performance loss during a TDP violation. Moreover, this known approach relies on non-deterministic analog measurements of the environment conditions within the system, which may cause inconsistent system performance among different users even though the users interact in identical manners with the system.

Other known solutions take a different approach by using unused power credits to switch to a higher power state in order to improve the performance if the solution detects that the system has not reached its TDP budget. However, these known solutions only respond to a TDP slack but do not react to an unexpected TDP violation in the higher performance mode.

Accordingly, there exists a need for an improved method and apparatus for adjusting power consumption level of an integrated circuit.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
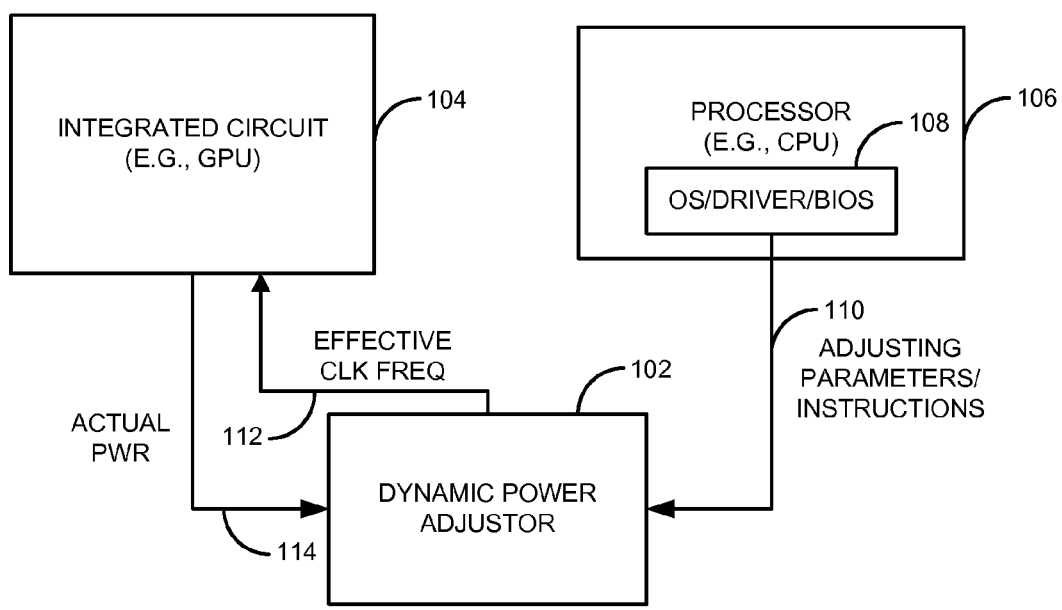
FIG. 1 is a block diagram illustrating one example of an apparatus including a dynamic power adjustor for adjusting power consumption level of an integrated circuit.

Briefly, a method and apparatus adjusts the power consumption level of an integrated circuit by dynamically scaling the clock frequency based on the real-time determined power consumption level. In one example, the method and apparatus changes an actual clock frequency of the integrated circuit to an effective clock frequency based on the maximum clock frequency and the difference between the threshold power consumption level and the actual power consumption level of the integrated circuit in the previous sampling interval. In one example, the method and apparatus determines an effective clock frequency of the integrated circuit in the current sampling interval. The effective clock frequency may be determined based on a maximum clock frequency and the difference between a threshold power consumption level and an actual power consumption level of the integrated circuit in the previous sampling interval. In one example, the difference between the maximum and effective clock frequencies in the current sampling interval is proportional to the difference between the threshold and actual power consumption levels in the previous sampling interval. The method and apparatus then changes the actual clock frequency of the integrated circuit to the determined effective clock frequency.

Among other advantages, the method and apparatus provides the ability to allow an integrated circuit to fine-grained control its response to a TDP violation and its recovery from a TDP slack, thereby reducing the performance impact. In other words, the relationship between the TDP budget and the real-time estimated power consumption level is dynamically factored into the magnitude of the response to the TDP violation and slack. Furthermore, the method and apparatus not only handles the situation where the power consumption level exceeds the TDP budget (i.e., TDP violation), but also reacts to the situation where the integrated circuit does not fully perform due to the unused power credits (i.e., TDP slack), so that the power consumption level and the performance of the integrate circuit are always adjusted toward the optimized value. Other advantages will be recognized by those of ordinary skill in the art.

The method and apparatus may determine the actual power consumption level of the integrated circuit based on activity data accumulated from each component of the integrated circuit. In one example, the method and apparatus accumulates the activity data of each component of the integrated circuit in the previous sampling interval. In this example, the method and apparatus then estimates a dynamic power consumption level of the integrated circuit based on the accumulated activity data and a power/activity scaling factor of each component of the integrated circuit, and estimates a static leakage power consumption level of the integrated circuit based on a voltage and temperature level of the integrated circuit. In this example, the method and apparatus further determines the actual power consumption level of the integrated circuit based on the estimated dynamic power consumption level and static leakage power consumption level.

The method and apparatus may determine a frequency scaling factor based on the difference between the threshold power consumption level and the determined actual power consumption level of the integrated circuit. The value of the frequency scaling factor may be, for example, between a predetermined minimum frequency scaling factor and 100% (in some instances temporary "overboost" may be allowable allowing for a scaling factor of 100% in some limited instances). The method and apparatus then may determine the effective clock frequency based on the determined frequency scaling factor and the maximum clock frequency.

The method and apparatus may further adjust the power consumption level of the integrated circuit by scaling the voltage level and/or the input/output (I/O) speed of the integrated circuit. In one example, the method and apparatus changes the voltage level and the I/O speed of the integrated circuit based on the determined effective clock frequency.

Among other advantages, the method and apparatus provides the ability to allow an integrated circuit to fine-grained control its response to a TDP violation and its recovery from a TDP slack, thereby reducing the performance impact. In other words, the relationship between the TDP budget and the real-time estimated power consumption level is dynamically factored into the magnitude of the response to the TDP violation and slack. Furthermore, the method and apparatus not only handles the situation where the power consumption level exceeds the TDP budget (i.e., TDP violation), but also reacts to the situation where the integrated circuit does not fully perform due to the unused power credits (i.e., TDP slack), so that the power consumption level and the performance of the integrate circuit are always adjusted toward the optimized value. Other advantages will be recognized by those of ordinary skill in the art.

FIG. 1 illustrates one example of an apparatus 100 including a dynamic power adjustor 102 for adjusting power consumption level of an integrated circuit 104. The apparatus 100 may be any suitable device, for example, a laptop computer, desktop computer, media center, handheld device (e.g., mobile or smart phone, tablet, etc.), Blu-ray™ player, gaming console, set top box, printer, or any other suitable device. In this example, the apparatus 100 will be described as a computer system such as a laptop computer. The apparatus 100 may include one or more integrated circuits 104 such as a GPU, which operates at an actual clock frequency and has a predefined maximum power consumption level according to the TDP budget of the apparatus 100. In this example, the apparatus 100 may also include one or more processors 106, which implement an operating system (OS), drivers, and/or a basic input/output system (BIOS) 108. The processor 106 may be for example a central processing unit (CPU) having one or multiple cores, a general processor (e.g., APU, accelerated processing unit; GPGPU, general-purpose computing on GPU), or any other suitable processor. The apparatus 100 also includes the dynamic power adjustor 102 operatively coupled to the integrated circuit 104 and the processor 106. Although the dynamic power adjustor 102 in FIG. 1 is shown as a discrete component separated from the integrated circuit 104, it is understood that the dynamic power adjustor 102 may be integrated as part of the integrated circuit 104 in other examples. In response to receiving the adjusting parameters/instructions 110 from the OS, drivers, and/or BIOS 108 implement by the processor 106, the dynamic power adjustor 102 is operative to adjust the power consumption level of the integrated circuit 104 by sending signals indicating the effective clock frequency 112 of the integrated circuit 104 based on the estimated actual power consumption level 114 of the integrated circuit 104. It is understood that any other suitable components such as controllers and storage devices may also be included in the apparatus 100.

Figure 2:
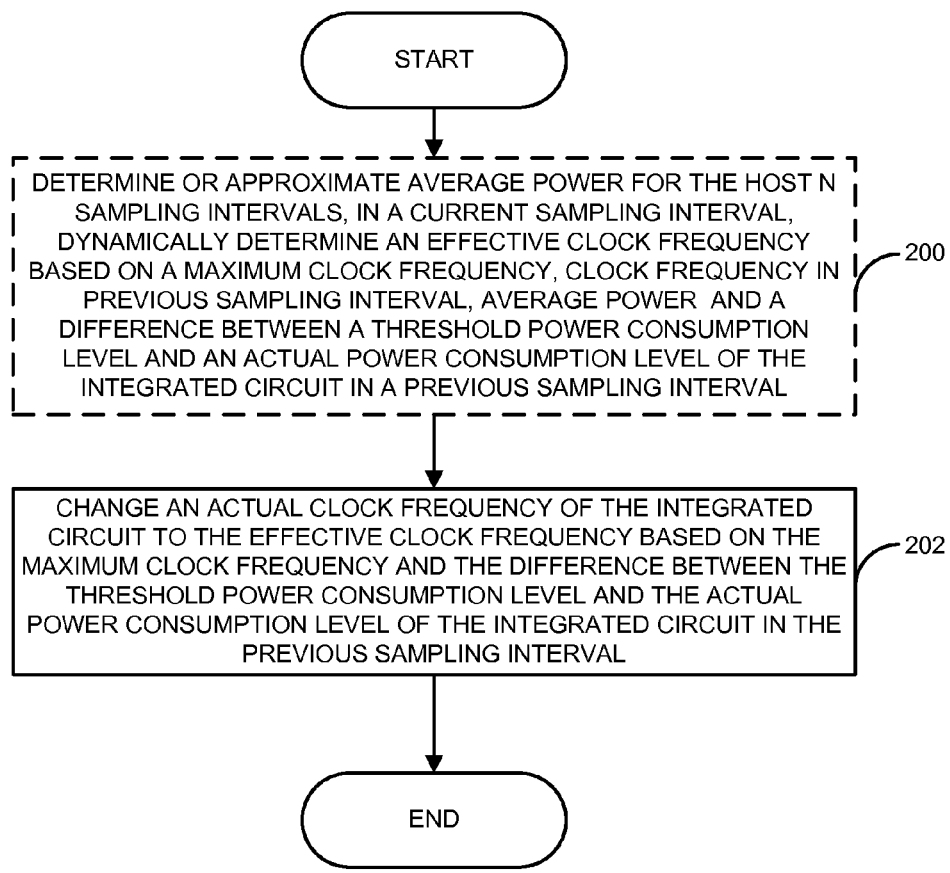
FIG. 2 is a flowchart illustrating one example of a method for adjusting power consumption level of an integrated circuit.

FIG. 2 illustrates one example of a method for adjusting power consumption level of an integrated circuit. It will be described with reference to FIG. 1. However, any suitable logic or structure may be employed. In operation, at block 200, if desired, the average power or an approximation thereof for the last N sampling interval is done. An effective clock frequency is dynamically determined in the current sampling interval based on a maximum clock frequency, clock frequency in a previous sampling interval, the determined average power and the difference between a threshold power consumption level and an actual power consumption level of the integrated circuit in the previous sampling interval. As described above, this may be performed by the dynamic power adjustor 102 of the apparatus 100. In one example, the effective clock frequency is dynamically determined such that the difference between the maximum clock frequency and the effective clock frequency in the current sampling interval is proportional to the difference between the threshold power consumption level and the actual power consumption level in the previous sampling interval. At block 202, the actual clock frequency of the integrated circuit is changed to the effective clock frequency determined at block 200. As described above, this may be also performed by the dynamic power adjustor 102 of the apparatus 100. It is known that the engine clock of an integrated circuit such as a GPU or CPU includes clocks powering all computational components, which consume most of the dynamic power of the integrated circuit. Thus, the change of the clock frequency in turn achieves the adjustment of the power consumption level of the integrated circuit. The blocks 200 and 202 are further illustrated in FIG. 5.

Figure 3:
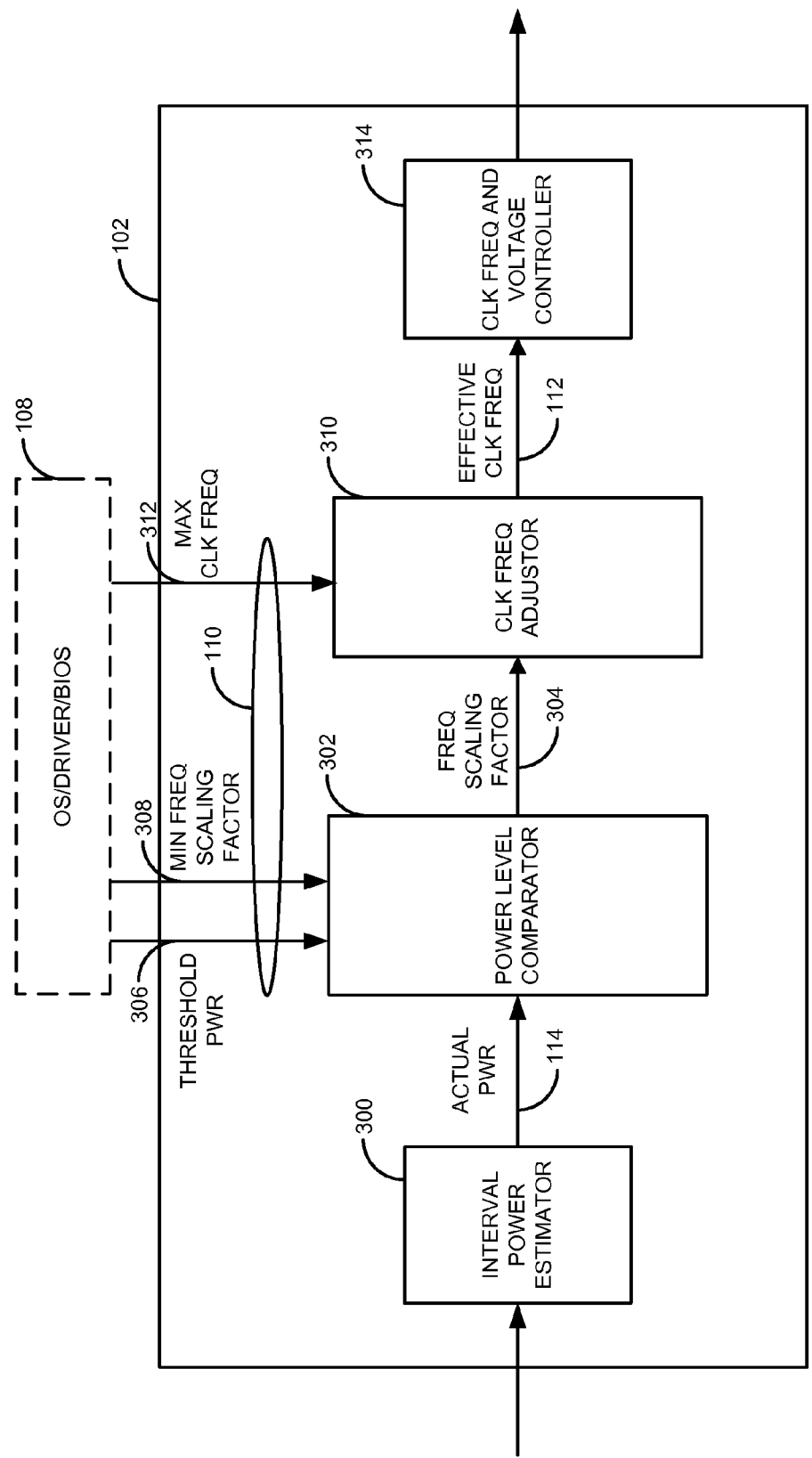
FIG. 3 is a block diagram illustrating one example of the dynamic power adjustor shown in FIG. 1 in accordance with one embodiment set forth in the disclosure.

FIG. 3 illustrates one example of the dynamic power adjustor 102 for adjusting power consumption level of the integrated circuit 104 shown in FIG. 1. In this example, the dynamic power adjustor 102 includes an interval power estimator 300 operatively coupled to the integrated circuit 104. The interval power estimator 300 may be implemented by any suitable hardware, executing firmware, executing software module, or any suitable combination thereof that can perform the desired function, such as programmed processors, discrete logic, for example, state machine, to name a few. The interval power estimator 300 is operative to determine the actual power consumption level 114 of the integrated circuit 104 in one sampling interval based on activity data accumulated from each component of the integrated circuit 104. In other words, the interval power estimator 300 returns the value indicating the estimated power consumed by the integrated circuit 104 in the previous sampling interval. The sampling interval may be, for example, no less than 100 ns. It is understood that the sampling interval may be changed in other examples to achieve a more or less fine-grained control of the power consumption level of the integrated circuit 104.

In one embodiment, the interval power estimator 300 accumulates the activity data of each component of the integrated circuit 104. The interval power estimator 300 then estimates a dynamic power consumption of the integrated circuit 104 based on the accumulated activity data and a power/activity scaling factor of each component of the integrated circuit 104. That is, the dynamic power consumption level may be calculated by measuring the activity levels in each component of the integrated circuit 104. Each activity level is then scaled by the power/activity scaling factor proportional to the amount of dynamic power consumed for that component under load. The power/activity scaling factor may be tuned, for example, by using empirical data. Optionally or additionally, the interval power estimator 300 may also estimate a static leakage power consumption level of the integrated circuit 104 based on a voltage and temperature level of the integrated circuit 104. The static leakage power consumption level is calculated by indexing into a table based on the voltage level and the temperature. The table may be derived, for example, using empirical data. The interval power estimator 300 may determine the actual power consumption level 114 of the integrated circuit 104 based on both the dynamic power consumption level and static leakage power consumption level to maximize the performance of the integrated circuit 104, or may omit the static leakage power consumption level from the actual power consumption level 114 to achieve determinism. This embodiment is also disclosed in a corresponding U.S. patent application Ser. No. 12/788,404, having a title "REAL-TIME POWER MANAGEMENT OF INTEGRATED CIRCUITS", owned by instant assignee, which is incorporated herein by reference.

In another embodiment, the interval power estimator 300 retrieves an indicator from a power supply or another power-measuring component of the integrated circuit 104 and ascertains the power consumption level of the integrated circuit 104 within a degree of accuracy by a TDP clamping algorithm as set forth herein. It is known in the art that various types of suitable power-measuring components may be integrated on the integrated circuit 104 or operatively coupled to the integrated circuit 104 to provide the information regarding the power consumption level. The interval power estimator 300 then retrieves such information, for example, through a serial bus protocol or by converting an analog input signal into a digital value from the power supply or the power-measuring component.

The dynamic power adjustor 102 may also include a power level comparator 302 operatively coupled to the interval power estimator 300. The power level comparator 302 may be implemented by any suitable executing software module, hardware, executing firmware, or any suitable combination thereof that can perform the desired function, such as programmed processors, discrete logic, for example, state machine, to name a few. The power level comparator 302 in this example is operative to determine a frequency scaling factor 304 in the current sampling interval based on the difference between the threshold power consumption level 306 and the determined actual power consumption level 114 of the integrated circuit 104. In this example, the power level comparator 302 receives the value of the actual power consumption level 114 from the interval power estimator 300 and the values of the threshold power consumption level 306 and the minimum frequency scaling factor 308, which are part of the adjusting parameters/instructions 110, from the OS, drivers, and/or BIOS 108. The power level comparator 302 then returns the value of the frequency scaling factor 304 used for providing the effective clock frequency 112 of the current sampling interval based on a comparison of the actual power consumption level (ActualPower) 114 and the threshold power consumption level (ThresholdPower) 306. The threshold power consumption level 306 may be the TDP budget limit of the integrated circuit 104 set statically or dynamically by the OS, drivers, and/or BIOS 108. For example, a default value of the threshold power consumption level 306 may be set and stored in the BIOS 108 of the apparatus 100. The user of the apparatus 100, however, may overwrite the default value by setting a custom value through a user interface of the OS 108 if desired. One example of the implementations of the power level comparator 302 is illustrated in FIG. 4.

Figure 4:
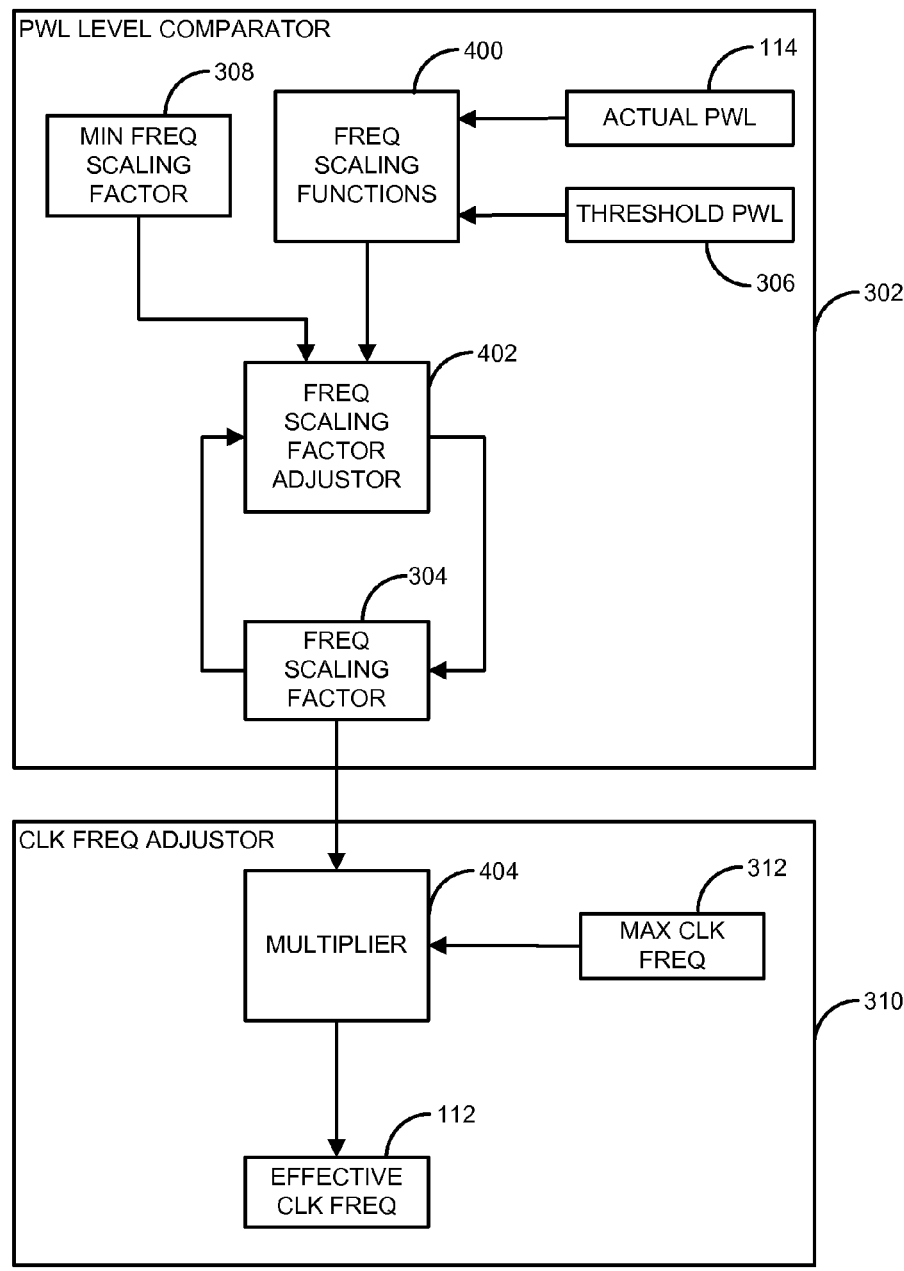
FIG. 4 is a block diagram illustrating one example of a power level comparator and a clock frequency adjustor of the dynamic power adjustor shown in FIG. 3 in accordance with one embodiment set forth in the disclosure.

Referring now to FIG. 4, the power level comparator 302 includes one or more frequency scaling functions 400. For example, a function $F_{adj\_over\_TDPLimit}$(ThresholdPower, ActualPower) calculates how much to adjust the frequency scaling factor 304 ($S_{ECLK}$) when ThresholdPower is exceeded by the ActualPower. The value returned by this function may be proportional to how much above the TDP budget. A function $F_{adj\_under\_TDPLimit}$(ThresholdPower, ActualPower) calculates how much to adjust the $S_{ECLK}$ when ActualPower is below the ThresholdPower. The value returned by this function may be proportional to how much below the TDP budget. Since it is not as imperative to restore performance as it is to reduce the power consumption level, the value returned by $F_{adj\_under\_TDPLimit}$ may be smaller than the value returned by $F_{adj\_over\_TDPLimit}$. The minimum frequency scaling factor ($S_{ELCK\_MIN}$) 308 may be employed by the power level comparator 302 to limit the value of which the frequency scaling factor 304 can drop blow. The minimum frequency scaling factor 308 may be a default value set and stored in the BIOS 108 of the apparatus 100. The values of the ActualPower, ThresholdPower, $S_{ELCK\_MIN}$, and $S_{ECLK}$ may be stored in any suitable storage device. For example, the values of the ThresholdPower and $S_{ELCK\_MIN}$ usually do not change in operation, unless being overwritten by the user and thus, may be stored in the BIOS 108 of the apparatus 100; while the values of the ActualPower and $S_{ECLK}$ may be updated in every sampling interval and thus, may be stored in a temporary storage device such as RAM.

In this example, the power level comparator 302 includes a frequency scaling factor adjustor 402 operative to update the frequency scaling factor 304 in the current sampling interval based on the frequency scaling factor 304 in the previous sampling interval, the minimum frequency scaling factor 308, and the frequency scaling functions 400. For example, the frequency scaling factor adjustor 402 may update the frequency scaling factor 304 in each sampling interval to achieve dynamical control. Below is one example of an operation performed by the frequency scaling factor adjustor 402:

---

If (ActualPower > ThresholdPower) then
    $S_{ECLK\_current} = S_{ECLK\_previous} - F_{adj\_over\_TDPLimit}$
    (ThresholdPower, ActualPower)
Else if (ActualPower < ThresholdPower) then
    $S_{ECLK\_current} = S_{ECLK\_previous} + F_{adj\_under\_TDPLimit}$
    (ThresholdPower, ActualPower)
Else
    Do not do anything
(The scaling factor $S_{ECLK}$ may be saturated to within its own range)
If ($S_{ECLK\_current}$ > 100%) then
    $S_{ECLK\_current}$ = 100%
Else if ($S_{ECLK\_current} < S_{ECLK\_MIN}$) then
    $S_{ECLK\_current} = S_{ECLK\_MIN}$

---

Referring back to FIG. 3, the dynamic power adjustor 102 may further include a clock frequency adjustor 310 operatively coupled to the power level comparator 302. The clock frequency adjustor 310 may be implemented by any suitable executing software module, hardware, executing firmware, or any suitable combination thereof that can perform the desired function, such as programmed processors, discrete logic, for example, state machine, to name a few. The clock frequency adjustor 310 in this example is operative to determine the effective clock frequency 112 in the current sampling interval based on the determined frequency scaling factor 304 and the maximum clock frequency 312. In this example, the clock frequency adjustor 310 receives the value of the frequency scaling factor ($S_{ECLK}$) 304 from the power level comparator 302 and the value of the maximum clock frequency ($f_{ECLK\_MAX}$) 312, which is part of the adjusting parameters/instructions 110, from the OS, drivers, and/or BIOS 108. The clock frequency adjustor 310 then returns the value of the effective clock frequency ($f_{ECLK}$) 112 of the current sampling interval. The maximum clock frequency 312 may be the maximum clock frequency at which the integrated circuit 104 can operate if no TDP violation happens, and may be set and stored in the BIOS 108 of the apparatus 100 as a default value. Referring now to FIG. 4, in one example, the clock frequency adjustor 310 includes a multiplier 404 operative to multiply the value of the maximum clock frequency 312 by the value of the frequency scaling factor 304 to return the value of the effective clock frequency 112.

$$f_{ECLK} = f_{ECLK\_MAX} \cdot S_{ECLK}$$

The values of the $f_{ECLK}$ and $f_{ECLK\_MAX}$ may be stored in any suitable storage device known in the art.

Referring back to FIG. 3, the dynamic power adjustor 102 may further include a clock frequency controller 314 operatively coupled to the clock frequency adjustor 310. The clock frequency controller 314 may be implemented by any suitable hardware, executing software module, executing firmware, or any suitable combination thereof that can perform the desired function, such as programmed processors, discrete logic, for example, state machine, to name a few. The clock frequency controller 314 is operative to change the actual clock frequency of the integrated circuit 104 to the effective clock frequency 112. In one example, the clock frequency controller 314 may include an interface to the phase-locked loop (PLL) used for generating clocks and a finite-state machine (FSM) that can perform gradual stepping of the PLL to a new target frequency. In other words, the effective clock frequency ($f_{ECLK}$) 112 determined by the clock frequency adjustor 310 may take effect by pushing the new value of the current sampling interval into the PLL FSM in the form of a function SetECLKFrequency ($f_{ECLK}$). It is understood that, however, any other suitable technology known in the art for adjusting the actual clock frequency of the integrated circuit 104 based on the determined effective clock frequency 112 may be employed herein.

As noted above, the clock frequency controller 314 may increase or decrease the clock frequency depending on whether a TDP violation or a TDP slack happens. Because it is not as imperative to restore performance as it is to reduce the power consumption level, the clock frequency controller 314 may increase the actual clock frequency in case of TDP slacks at a rate lower than decreasing the actual lock frequency in case of TDP violations, so that the recovery from the previous TDP claiming event will not trigger another over-budge scenario.

Figure 5:
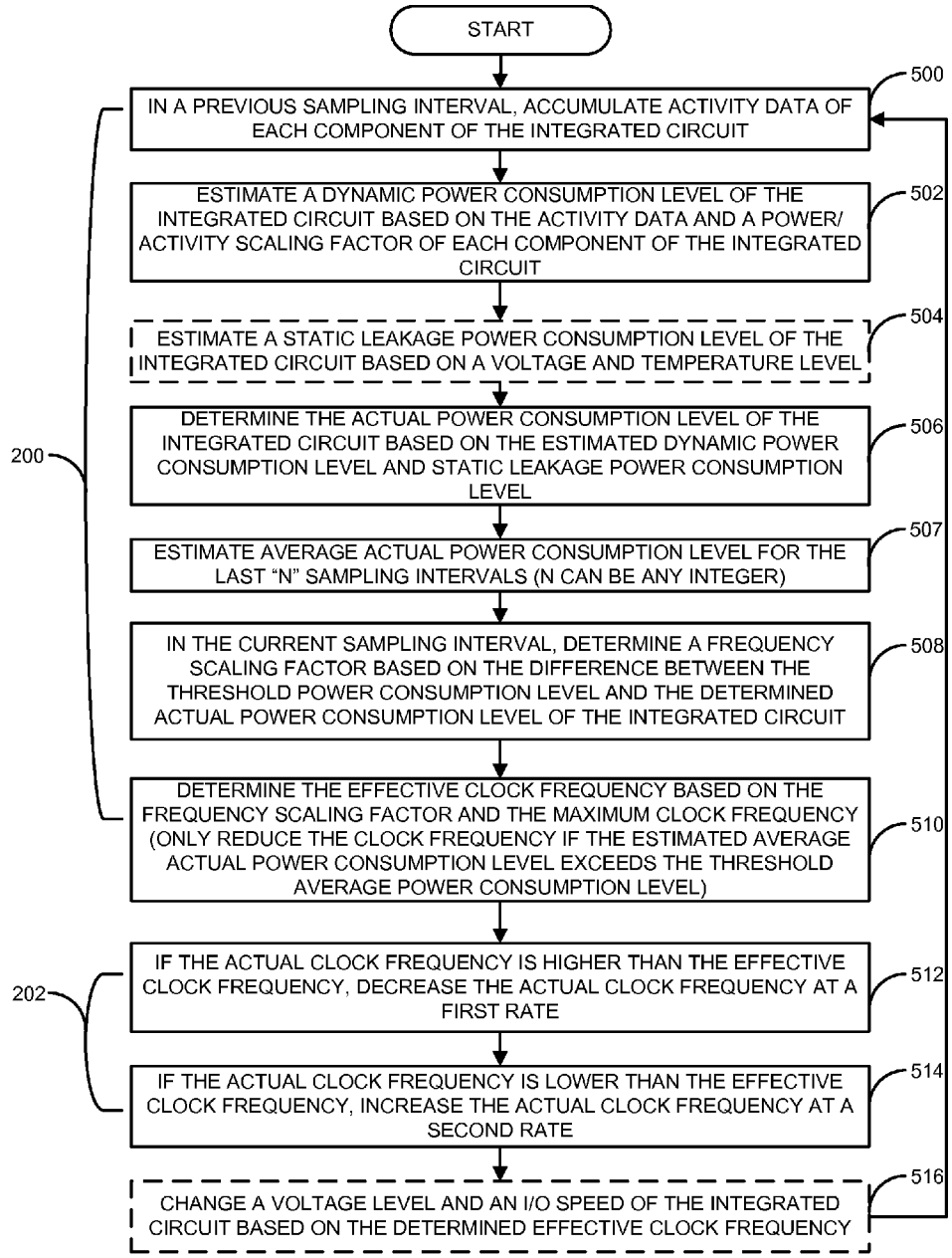
FIG. 5 is a flowchart illustrating one example of the method for adjusting power consumption level of an integrated circuit shown in FIG. 2 in accordance with one embodiment set forth in the disclosure.

FIG. 5 illustrates another example of a method for adjusting power consumption level of an integrated circuit. It will be described with reference to FIGS. 3 and 4. However, any suitable logic or structure may be employed. In operation, starting from block 500, activity data of each component of the integrated circuit is accumulated in one sampling interval. As described above, this may be performed by the interval power estimator 300 of the dynamic power adjustor 102. The activity data includes the activity levels of all the computational components powered by the engine clock of the integrated circuit 104. Based on the activity data accumulated on block 500 and the power/activity scaling factor of each component of the integrated circuit, a dynamic power consumption level of the integrated circuit is estimated at block 502. As described above, this may be also performed by the interval power estimator 300 of the dynamic power adjustor 102. The power/activity scaling factor may be adjusted by empirical data. Optionally, at block 504, the static leakage power consumption level of the integrated circuit may be estimated based on the voltage and temperature level of the integrated circuit. As described above, this may be also performed by the interval power estimator 300 of the dynamic power adjustor 102. The voltage and temperature level of an integrated circuit may be obtained by any suitable techniques known in the art. Proceeding to block 506, the actual power consumption level of the integrated circuit is determined based on the estimated dynamic power consumption level determined at block 502 and the estimated static leakage power consumption level determined at block 504. As described above, this may be also performed by the interval power estimator 300 of the dynamic power adjustor 102. For example, the actual power consumption level is the sum of the dynamic and static leakage power consumption levels. It is understood that, however, the actual power consumption level may be derived solely from the dynamic power consumption level when block 504 is omitted. In block 507, an average actual power consumption level is estimated for the last N sampling interval (N can be any suitable integer).

Switching from the previous sampling interval to the current sampling interval, at block 508, a frequency scaling factor is determined based on the difference between the threshold power consumption level and the determined actual power consumption level of the integrated circuit. As described above, this may be performed by the power level comparator 302 of the dynamic power adjustor 102. In one example, the value of the frequency scaling factor is limited between a predetermined minimum frequency scaling factor and 100%. In this range, the value of the frequency scaling factor may be proportional to the difference between the threshold and actual power consumption levels. At block 510, the effective clock frequency is determined based on the frequency scaling factor determined at block 508 and a maximum clock frequency of the integrated circuit. This may include only reducing the clock frequency if the estimated average actual power consumption level exceeds the threshold average power consumption level. As described above, this may be performed by the clock frequency adjustor 310 of the dynamic power adjustor 102. For example, the effective clock frequency is the product of the frequency scaling factor and the maximum clock frequency.

Proceeding to block 512, the actual clock frequency of the integrated circuit is decreased at a first rate if the actual clock frequency is higher than the effective clock frequency. That is, a TDP violation event will trigger the frequency of the engine clock to be reduced to the determined effective clock frequency in order to eliminate the violation. At block 514, the actual clock frequency of the integrated circuit is increased at a second rate if the actual clock frequency is lower than the effective clock frequency. In other words, a performance slack event caused by too much clock frequency reduction will trigger the frequency of the engine clock to be resumed to the maximum level. The second rate at block 514, for example, is lower than the first rate at block 512 because it is not as imperative to restore performance as t is to avoid TDP violation. As described above, blocks 512 and 514 may be performed by the clock frequency controller 314 of the dynamic power adjustor 102.

Additionally or optionally, at block 516, the voltage level and I/O speed of the integrated circuit may be changed based on the determined effective clock frequency. This may be also performed by the clock frequency controller 314 of the dynamic power adjustor 102. In addition to clock frequency scaling, the power consumption of an integrated circuit may be also adjusted by voltage scaling and/or I/O interface scaling. For example, if the clock frequency cannot be scaled any further, the voltage level and/or the I/O speed of the integrated circuit may be scaled to further adjust the power consumption level. In one example, if the determined frequency scaling factor 304 is smaller than the minimum frequency scaling factor 308, it triggers the clock frequency controller 314 to change the voltage level and I/O speed of the integrated circuit 104 to further adjust the power consumption level. The amount of the voltage scaling and I/O interface scaling may be proportional to the amount of the frequency scaling, such as the effective clock frequency or the value of the clock frequency scaling factor described above.

Blocks 500-516 may be repeated in the following sampling intervals. For example, the processing of blocks 500-516 may be performed repeatedly in each sampling interval when the apparatus 100 is in operation.

Figure 6:
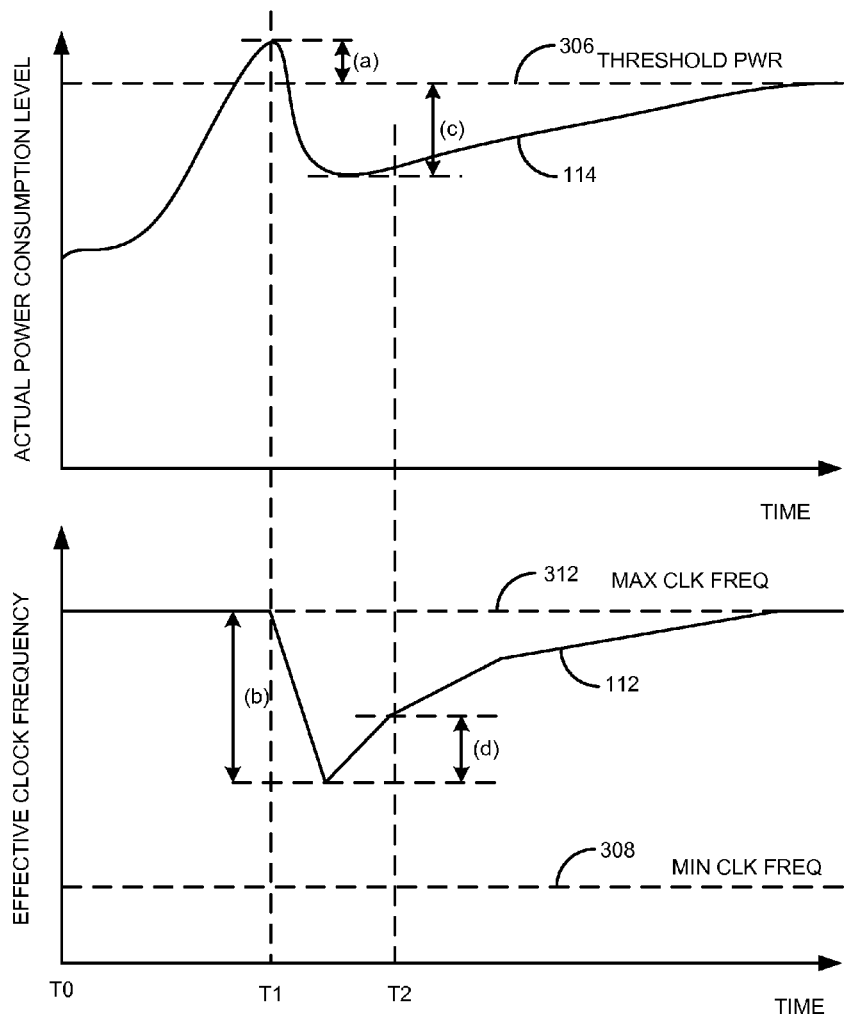
FIG. 6 is a diagram illustrating one example of adjusting an effective clock frequency of an integrated circuit based on an actual power consumption level of the integrated circuit.

FIG. 6 illustrates one example of adjusting the effective clock frequency 112 of the integrated circuit 104 based on the actual power consumption level 114. The diagrams illustrate the concept in a hypothetical situation where the actual power consumption level 114 starts below the threshold power consumption level 306 at timing point $T_0$ and continues to rise due to integrated circuit activity. At this time point, the frequency scaling factor 304 is set to 100% such that the effective clock frequency 112 is at the maximum clock frequency 312.

For example, at time point $T_1$, the interval power estimator 300 detects that the actual power consumption level 114 in this sampling interval has exceeded the threshold power consumption level 306. The function $F_{adj\_over\_TDPLimit}$ (ThresholdPower, ActualPower) 400 then calculates the difference (a) between the two power consumption levels 114, 306, and the dynamic power adjustor 102 adjusts the frequency scaling factor 304 by that quantity causing the effective clock frequency 112 to scale by the value (b). In one example, the value (b) may be conservatively large to protect the integrated circuit 104 and accounts for the value (a). This engine clock scaling causes the actual power consumption level 114 to drop below the threshold power consumption level 306.

For example, at time point $T_2$, the difference (c) between the actual power consumption level 114 and the threshold power consumption level 306 is calculated again in another sampling interval. Given that the actual power consumption level 114 is below its power budget (i.e., threshold power consumption level 306), the dynamic power adjustor 102 now attempts to do the opposite by attempting to restore its frequency back to the maximum clock frequency 312. The function $F_{adj\_under\_TDPLimit}$ (ThresholdPower, ActualPower) 400 is used to compute the value (d) based on the value (c). In one example, the value (d) may be conservatively small so that recovery from the previous TDP violation event will not trigger another over-budget scenario. For example, the scaling factor of the function $F_{adj\_under\_TDPLimit}$ (ThresholdPower, ActualPower) may be set to smaller than the scaling factor of the function $F_{adj\_over\_TDPLimit}$ (ThresholdPower, ActualPower).

Also, some or all of the logic or structure described herein may be implemented as one or more processors executing driver software or other suitable level of software stored on a computer readable medium such as but not limited to CDROM, RAM, other forms of ROM, hard drives, distributed memory, etc. The processor(s) may be for example one or more CPU, APU, GPGPU or any suitable combination thereof. As such, driver software may be stored on computer readable medium. The computer readable medium stores instructions executable by one or more processors that causes the one or more processors to perform operations described herein.

Among other advantages, the method and apparatus provides the ability to allow an integrated circuit to fine-grain control its response to a TDP violation and its recovery from a TDP slack, thereby reducing the performance impact. In other words, the relationship between the TDP budget and the real-time estimated power consumption level is dynamically factored into the magnitude of the response to the TDP violation and slack. Furthermore, the method and apparatus not only handles the situation where the power consumption level exceeds the TDP budget (i.e., TDP violation), but also reacts to the situation where the integrated circuit does not fully perform due to the unused power credits (i.e., TDP slack), so that the power consumption level and the performance of the integrate circuit are always adjusted toward the optimized value. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for adjusting power consumption level of an integrated circuit comprising:
    changing an actual clock frequency of the integrated circuit to an effective clock frequency based on a maximum clock frequency of the integrated circuit and a difference between a threshold power consumption level and an actual power consumption level of the integrated circuit in a previous sampling interval.

2. The method of claim 1 comprising, in a current sampling interval, dynamically determining the effective clock frequency based on the maximum clock frequency of the integrated circuit and the difference between the threshold power consumption level and the actual power consumption level of the integrated circuit in the previous sampling interval.

3. The method of claim 1 comprising dynamically determining the effective clock frequency such that a difference between the maximum clock frequency of the integrated circuit and the effective clock frequency in the current sampling interval is proportional to the difference between the threshold power consumption level and the actual power consumption level of the integrated circuit in the previous sampling interval.

4. The method of claim 1, wherein determining the effective clock frequency comprises, in the previous sampling interval, determining the actual power consumption level of the integrated circuit based on activity data accumulated from each component of the integrated circuit.

5. The method of claim 4, wherein determining the effective clock frequency further comprises:
    in the current sampling interval, determining a frequency scaling factor based on the difference between the threshold power consumption level and the determined actual power consumption level of the integrated circuit; and determining the effective clock frequency based on the determined frequency scaling factor and the maximum clock frequency of the integrated circuit.

6. The method of claim 4, wherein determining the actual power consumption level of the integrated circuit further comprises:
   in the previous sampling interval, accumulating the activity data of each component of the integrated circuit;
   estimating a dynamic power consumption level of the integrated circuit based on the accumulated activity data and a power/activity scaling factor of each component of the integrated circuit;
   estimating a static leakage power consumption level of the integrated circuit based on a voltage and temperature level of the integrated circuit; and
   determining the actual power consumption level of the integrated circuit based on the estimated dynamic power consumption level and static leakage power consumption level.

7. The method of claim 1, wherein changing the actual clock frequency of the integrated circuit comprises:
   if the actual clock frequency is higher than the effective clock frequency, decreasing the actual clock frequency at a first rate; and
   if the actual clock frequency is lower than the effective clock frequency, increasing the actual clock frequency at a second rate, wherein the second rate is lower than the first rate.

8. The method of claim 1 further comprising changing a voltage level and an input/output (I/O) speed of the integrated circuit based on the effective clock frequency.

9. The method of claim 5, wherein a value of the frequency scaling factor is between a predetermined minimum frequency scaling factor and a higher scaling factor.

10. The method of claim 9 wherein the higher scaling factor is 100%.

11. An apparatus comprising:
    an integrated circuit operating at an actual clock frequency; and
    a dynamic power adjustor, operatively coupled to the integrated circuit, operative to:
       change the actual clock frequency of the integrated circuit to an effective clock frequency based on a maximum clock frequency of the integrated circuit and a difference between a threshold power consumption level and an actual power consumption level of the integrated circuit in a previous sampling interval.

12. The apparatus of claim 11, wherein the dynamic power adjustor is further operative to, in a current sampling interval, dynamically determine the effective clock frequency based on the maximum clock frequency of the integrated circuit and the difference between the threshold power consumption level and the actual power consumption level of the integrated circuit in the previous sampling interval.

13. The apparatus of claim 11, wherein the dynamic power adjustor is further operative to dynamically determine the effective clock frequency such that a difference between the maximum clock frequency of the integrated circuit and the effective clock frequency in the current sampling interval is proportional to the difference between the threshold power consumption level and the actual power consumption level of the integrated circuit in the previous sampling interval.

14. The apparatus of claim 11, wherein the dynamic power adjustor comprises an interval power estimator operative to, in the previous sampling interval, determine the actual power consumption level of the integrated circuit based on activity data accumulated from each component of the integrated circuit.

15. The apparatus of claim 14, wherein the dynamic power adjustor further comprises:
    a power level comparator, operatively coupled to the interval power estimator, operative to, in the current sampling interval, determine a frequency scaling factor based on the difference between the threshold power consumption level and the determined actual power consumption level of the integrated circuit; and
    a clock frequency adjustor, operatively coupled to the power level comparator, operative to determine the effective clock frequency based on the determined frequency scaling factor and the maximum clock frequency of the integrated circuit.

16. The apparatus of claim 14, wherein the interval power estimator is further operative to:
    in the previous sampling interval, accumulate the activity data of each component of the integrated circuit;
    estimate a dynamic power consumption level of the integrated circuit based on the accumulated activity data and a power/activity scaling factor of each component of the integrated circuit;
    estimate a static leakage power consumption level of the integrated circuit based on a voltage and temperature level of the integrated circuit; and
    determine the actual power consumption level of the integrated circuit based on the estimated dynamic power consumption level and static leakage power consumption level.

17. The apparatus of claim 15 wherein the dynamic power adjustor further comprises a clock frequency controller, operatively coupled to the clock frequency adjustor, operative to:
    if the actual clock frequency is higher than the effective clock frequency, decrease the actual clock frequency at a first rate; and
    if the actual clock frequency is lower than the effective clock frequency, increase the actual clock frequency at a second rate, wherein the second rate is lower than the first rate.

18. The apparatus of claim 11, wherein the dynamic power adjustor is further operative to change a voltage level and an input/output (I/O) speed of the integrated circuit based on the effective clock frequency.

19. A computer readable storage medium comprising executable instructions that when executed by at least one processor causes the at least one processor to:
    in a current sampling interval, dynamically determine an effective clock frequency of an integrated circuit based on a maximum clock frequency of the integrated circuit and a difference between a threshold power consumption level and an actual power consumption level of the integrated circuit in a previous sampling interval; and
    change an actual clock frequency of the integrated circuit to the effective clock frequency based on the maximum clock frequency of the integrated circuit and the difference between the threshold power consumption level and the actual power consumption level of the integrated circuit in the previous sampling interval.

20. The computer readable storage medium of claim 19 further comprising executable instructions that when executed by at least one processor causes the at least one processor to dynamically determine the effective clock frequency such that a difference between the maximum clock frequency of the integrated circuit and the effective clock frequency in the current sampling interval is proportional to the difference between the threshold power consumption level and the actual power consumption level of the integrated circuit in the previous sampling interval.

21. The computer readable storage medium of claim 19 further comprising executable instructions that when executed by at least one processor causes the at least one processor to, in the previous sampling interval, determine the actual power consumption level of the integrated circuit based on activity data accumulated from each component of the integrated circuit.

22. The computer readable storage medium of claim 21 further comprising executable instructions that when executed by at least one processor causes the at least one processor to:

in the current sampling interval, determine a frequency scaling factor based on the difference between the threshold power consumption level and the determined actual power consumption level of the integrated circuit; and determine the effective clock frequency based on the determined frequency scaling factor and the maximum clock frequency of the integrated circuit.

23. The computer readable storage medium of claim 19 further comprising executable instructions that when executed by at least one processor causes the at least one processor to:

if the actual clock frequency is higher than the effective clock frequency, decrease the actual clock frequency at a first rate; and if the actual clock frequency is lower than the effective clock frequency, increase the actual clock frequency at a second rate, wherein the second rate is lower than the first rate.

* * * * *